(12) United States Patent
Nilo et al.

(10) Patent No.: US 7,760,767 B2
(45) Date of Patent: Jul. 20, 2010

(54) WIDE AREA PEER-TO-PEER SYNCHING IN A DECENTRALIZED ENVIRONMENT

(75) Inventors: Bruce Nilo, Cupertino, CA (US); Gordie Freedman, Palo Alto, CA (US); Toby Paterson, Paris (FR)

(73) Assignee: Apple Inc., Cupertino, CA (US)

( * ) Notice: Subject to any disclaimer, the term of this patent is extended or adjusted under 35 U.S.C. 154(b) by 525 days.

(21) Appl. No.: 11/620,618

(22) Filed: Jan. 5, 2007

(65) Prior Publication Data

US 2008/0165807 A1    Jul. 10, 2008

(51) Int. Cl.
*H04J 3/06* (2006.01)

(52) U.S. Cl. ................. 370/503; 370/400; 370/509

(58) Field of Classification Search ........... 370/503, 370/401, 400, 509
See application file for complete search history.

(56) References Cited

U.S. PATENT DOCUMENTS

| | | |
|---|---|---|
| 4,792,909 A | 12/1988 | Serlet |
| 5,287,496 A | 2/1994 | Chen et al. |
| 5,355,483 A | 10/1994 | Serlet |
| 5,481,721 A | 1/1996 | Serlet et al. |
| 5,490,246 A | 2/1996 | Brotsky et al. |
| 5,687,370 A | 11/1997 | Garst et al. |
| 5,710,900 A | 1/1998 | Anand et al. |
| 5,710,922 A | 1/1998 | Alley et al. |
| 5,727,202 A | 3/1998 | Kucala |
| 5,758,358 A | 5/1998 | Ebbo |
| 5,832,489 A | 11/1998 | Kucala |
| 5,884,323 A | 3/1999 | Hawkins et al. |
| 5,946,689 A | 8/1999 | Yanaka et al. |
| 5,991,771 A | 11/1999 | Falls et al. |
| 6,000,000 A | 12/1999 | Hawkins et al. |
| 6,006,231 A | 12/1999 | Popa |
| 6,006,274 A | 12/1999 | Hawkins et al. |
| 6,026,415 A | 2/2000 | Garst et al. |
| 6,188,995 B1 | 2/2001 | Garst et al. |
| 6,272,558 B1 | 8/2001 | Hui et al. |
| 6,295,541 B1 | 9/2001 | Bodnar et al. |

(Continued)

FOREIGN PATENT DOCUMENTS

EP    0 694 879 A2    1/1996

(Continued)

OTHER PUBLICATIONS

International Search Report and Written Opinion for PCT/US2007/087861, mailed May 8, 2008, 10-pgs.

(Continued)

*Primary Examiner*—Kwang B Yao
*Assistant Examiner*—Jung Liu
(74) *Attorney, Agent, or Firm*—Wong, Cabello, Lutsch, Rutherford & Brucculeri LLP

(57) ABSTRACT

A system and method are disclosed for synchronizing data between devices and more particularly for synchronizing data between a plurality of peer-to-peer devices in a decentralized environment where no one device stores the most "recent" or "true" version of the data. Embodiments of the invention relate concepts of discovering synchronizing peers, communication between peers using special techniques, and using a way station concept as an aid for both discovery and synchronization between peers that are not simultaneously available.

54 Claims, 10 Drawing Sheets

U.S. PATENT DOCUMENTS

| | | | |
|---|---|---|---|
| 6,304,884 B1 | 10/2001 | Garst et al. | |
| 6,308,201 B1 | 10/2001 | Pivowar et al. | |
| 6,330,618 B1 | 12/2001 | Hawkins et al. | |
| 6,360,272 B1 | 3/2002 | Lincke et al. | |
| 6,401,112 B1 | 6/2002 | Boyer et al. | |
| 6,457,062 B1 | 9/2002 | Pivowar et al. | |
| 6,505,215 B1 | 1/2003 | Kruglikov et al. | |
| 6,516,327 B1* | 2/2003 | Zondervan et al. | 707/200 |
| 6,553,037 B1 | 4/2003 | Pivowar et al. | |
| 6,571,262 B2 | 5/2003 | Garst et al. | |
| 6,717,599 B1 | 4/2004 | Olano | |
| 6,820,088 B1* | 11/2004 | Hind et al. | 707/101 |
| 6,892,210 B1* | 5/2005 | Erickson et al. | 707/201 |
| 6,925,477 B1 | 8/2005 | Champagne et al. | |
| 7,167,920 B2* | 1/2007 | Traversat et al. | 709/230 |
| 2002/0049764 A1 | 4/2002 | Boothby et al. | |
| 2003/0093431 A1 | 5/2003 | Cooke et al. | |
| 2003/0131004 A1 | 7/2003 | Krishna et al. | |
| 2003/0172070 A1* | 9/2003 | Sawadsky et al. | 707/10 |
| 2004/0214926 A1 | 10/2004 | Bittner | |
| 2006/0031587 A1 | 2/2006 | Paterson et al. | |
| 2006/0041603 A1 | 2/2006 | Paterson et al. | |
| 2006/0066588 A1 | 3/2006 | Lyon et al. | |
| 2006/0069809 A1 | 3/2006 | Serlet | |
| 2006/0288053 A1 | 12/2006 | Holt et al. | |
| 2007/0276836 A1* | 11/2007 | Chatterjee et al. | 707/10 |
| 2008/0005188 A1* | 1/2008 | Li et al. | 707/201 |
| 2008/0005195 A1* | 1/2008 | Li | 707/203 |
| 2008/0034009 A1 | 2/2008 | Freedman et al. | |
| 2008/0165807 A1 | 7/2008 | Nilo et al. | |
| 2008/0168183 A1 | 7/2008 | Marcy et al. | |

FOREIGN PATENT DOCUMENTS

| | | |
|---|---|---|
| EP | 1 383 080 A1 | 1/2004 |
| WO | WO 98/45815 A1 | 10/1998 |
| WO | 01/06364 A | 1/2001 |
| WO | WO 01/06364 A2 | 1/2001 |
| WO | 2005/112388 A | 11/2005 |
| WO | WO 2005/112388 A1 | 11/2005 |

OTHER PUBLICATIONS

Abuan et al.; U.S. Appl. No. 10/769,841, filed on Feb. 2, 2004.

Demers et al.; "Epidemic Algorithms for Replicated Database Maintenance;" Xerox Palo Alto Research Center; (c) 1987.

Patent Cooperation Treaty International Search Report received in International Application No. PCT/US2005/022930 mailed Oct. 27, 2005.

Babaoğlu et al.; "Consistent Global States of Distributed Systems: Fundamental Concepts and Mechanisms;" Technical Report UBLCS-93-1; Jan. 1993; Laboratory for Computer Science University of Bologna.

* cited by examiner

| Step | Instigator A 701 | Collaborator B 702 | Collaborator C 703 |
|---|---|---|---|
| 1 – 750 | instigator peer A begins its process of initiating a sync by determining the extent of all possible collaborators | | |
| 2 – 752 | instigator peer A initiates a sync by requesting that all collaborator peers perform a local sync | | |
| 3 – 753 | | Collaborator performs a local synchronization and produces one or more change sets | Collaborator performs a local synchronization and produces one or more change sets |
| 4 – 754 | | collaborator stores change set(s) | collaborator stores change set(s) |
| 5 – 755 | | Collaborator sends changes sets to instigator | Collaborator sends changes sets to instigator |
| 6 – 756 | Instigator stores changes sets designated as incoming change sets. | | |
| 7 – 757 | Instigator acknowledges receipt of change sets | | |
| 8 – 758 | | Collaborate deletes change sets | Collaborate deletes change sets |
| 9 – 759 | Instigator performs a local sync and produces change sets | | |
| 10 – 7510 | Instigator propagates change sets | | |
| 11 – 7511 | | Collaborators performs local synchronization but does not produce change set | Collaborators performs local synchronization but does not produce change set |

Figure 7

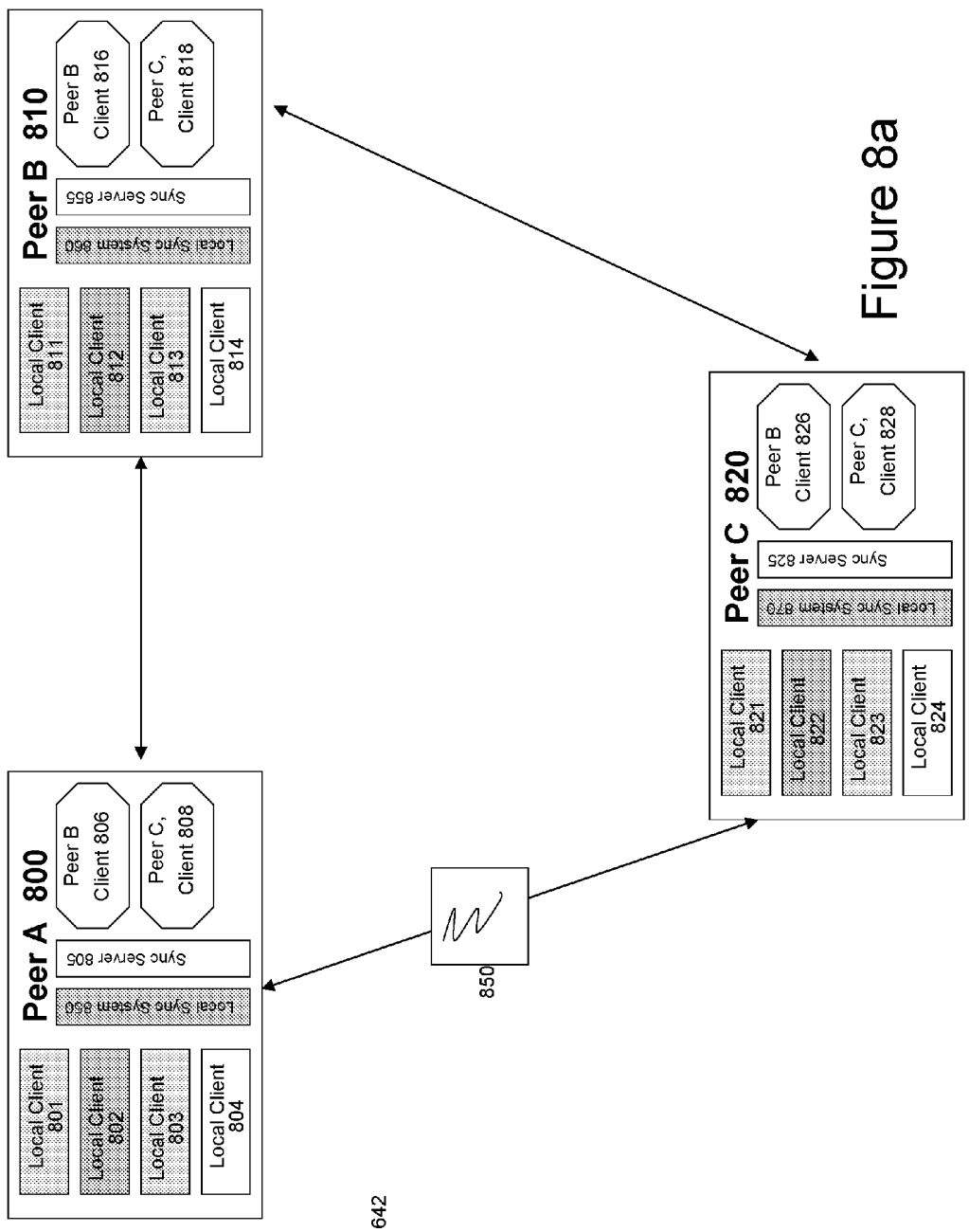

WIDE AREA PEER-TO-PEER SYNCHING IN A DECENTRALIZED ENVIRONMENT

FIELD OF THE DISCLOSURE

The subject matter of the present disclosure generally relates to apparatus and methods for synchronizing data between devices and more particularly relates to apparatus and methods for synchronizing data between a plurality of peer-to-peer devices in a decentralized environment where no one device stores the most "recent" or "true" version of the data.

BACKGROUND OF THE DISCLOSURE

Synchronization is a function that provides or maintains consistency between data sets. For example, a desktop computer may have desktop data sets regarding personal information management ("PIM"). A user of that desktop computer may desire to use that PIM data when she is away from her desktop computer. Therefore, she may desire access to the PIM data while using a laptop computer or a personal digital assistant ("PDA") such as a phone or other device (terminal, computer, handheld, embedded computer etc.). In order to accommodate that desire, her laptop computer and PDA may each carry PIM data sets that correspond to the PIM data sets on the desktop computer. The role of the synchronization function is to give the user a common view of her data on each device. This role is generally accomplished by synchronization events when two or more of the devices synchronize.

A common technique for synchronizing devices is by using snapshots of data at a point in time and comparing current data to the snapshot to determine what has changed (snapshots may be maintained for the local database and for other peers in a set of syncing peers). For illustration purposes, refer to FIG. 1 where there is shown a model for two devices, a desktop computer 100 and a portable computer 110. Desktop computer has PIM database 101, which keeps current information for PIM data sets that are edited or added on the desktop computer 100. Desktop computer 100 also has desktop snapshot database, which is a snapshot of the PIM data sets taken at some point in time but typically the time of a prior synchronization (perhaps, the most recent synchronization). Similarly, portable computer 110 has portable database 111 for current PIM data (and, like PDA 120 or any syncing peer, may also have a snapshot database). Having these structures in place, we may attempt to synchronize desktop 100 and portable 110. Typical synchronization occurs by comparing both portable database 111 and desktop database 101 with snapshot database 102. During the compare operation, we can then assemble a list of data items that are new or changed in the active databases 101 and 111 as compared to database 102 (e.g. this may be called a change-set). Finally, to finish out the synchronization, the list of new and changed data may be used to update all three databases 101, 102, and 111.

As more users begin to store structured data and each user begins to carry several corresponding sets of structured data on different devices, the task of maintaining common views of data sets becomes more challenging. One exemplary problematic area is the task of synchronizing data between devices that do not come in close proximity to one and other. For example, a user may have a computer at home, another computer at the office, and a data-carrying PDA that is anchored in a service vehicle. If the user wishes to synchronize data across these three devices, she must do so over various networks such as the Internet, the phone network or some other communication mechanisms. In the prior art, there are suggested techniques for using an intermediary server and other techniques for partially solving the problem.

Some of the related prior art techniques for synchronization may be found in the following U.S. Pat. No. 5,710,922 "Method for synchronizing and archiving information between computer systems," which is incorporated herein by reference. In addition, the following pending patent applications offer similarly interesting information and are hereby incorporated by reference: "A Method of Synchronizing Between Three or More Devices" by Toby Paterson and Jerome Lebel, having application Ser. No. 10/853,306 and filed May 24, 2004; "A Method of Synchronizing" by Toby Paterson and Jerome Lebel, having application Ser. No. 10/852,926 and filed May 24, 2004; and "Apparatus And Method For Peer-To-Peer N-Way Synchronization In A Decentralized Environment," having application Ser. No. 11/157,647 and filed Jun. 21, 2005.

In view of the discussion herein as well as the other problems existing in the prior art the solutions and inventions as discussed below are proposed.

SUMMARY OF THE PRESENT DISCLOSURE

The many embodiments disclosed herein propose systems and methods for peer-to-peer synchronization. In one such embodiment, a control flow is disclosed for synchronizing a plurality of peers. In that embodiment, an instigator peer is appointed. Once appointed, the instigator peer makes a request to other peers in the system ("collaborator peers") to perform local synchronization. Embodiments provide for collaborator peers in the system to comply with that request, and in performing such local synchronizations, the collaborator peers each produce change-sets. The collaborator change-sets are propagated back to the instigator peer, where the collaborator change-sets are used for a local synchronization on the instigator peer. This local synchronization produces instigator change-sets designated for distribution to each of the collaborator peers. The collaborator peers receive the instigator change-sets and perform a second local synchronization, thus substantially completing the group synchronization.

In addition to the control flow discussed above, some embodiments of the invention contemplate the use of a way station module. The way station module provides a holding place for change-sets or other data and information. The synchronizing peers may use this holding place to transfer data and information to peers that are unavailable at the desired time of transfer. The transferee peers may also use this holding place to convey data or information back to the transferor. By using this holding place or way station, two peers can synchronize in a peer-to-peer system even though those peers do not communicate directly. Moreover, the use of the way station concept creates a second path for synchronization and some embodiments disclosed herein contemplate various optimizations for peer-to-peer synchronization over multiple paths.

Lastly, in a peer-to-peer synchronization system, there may be use in communicating across WANs and even the Internet. As such, embodiments of the invention contemplate the use of a NAT traversal and other techniques to operate synchronization services across WANs, LANs, the Internet or heterogeneous networks.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 7 shows a flow for multi-peer synchronization.

FIG. 8a shows a group of sync peers.

Figure 1:
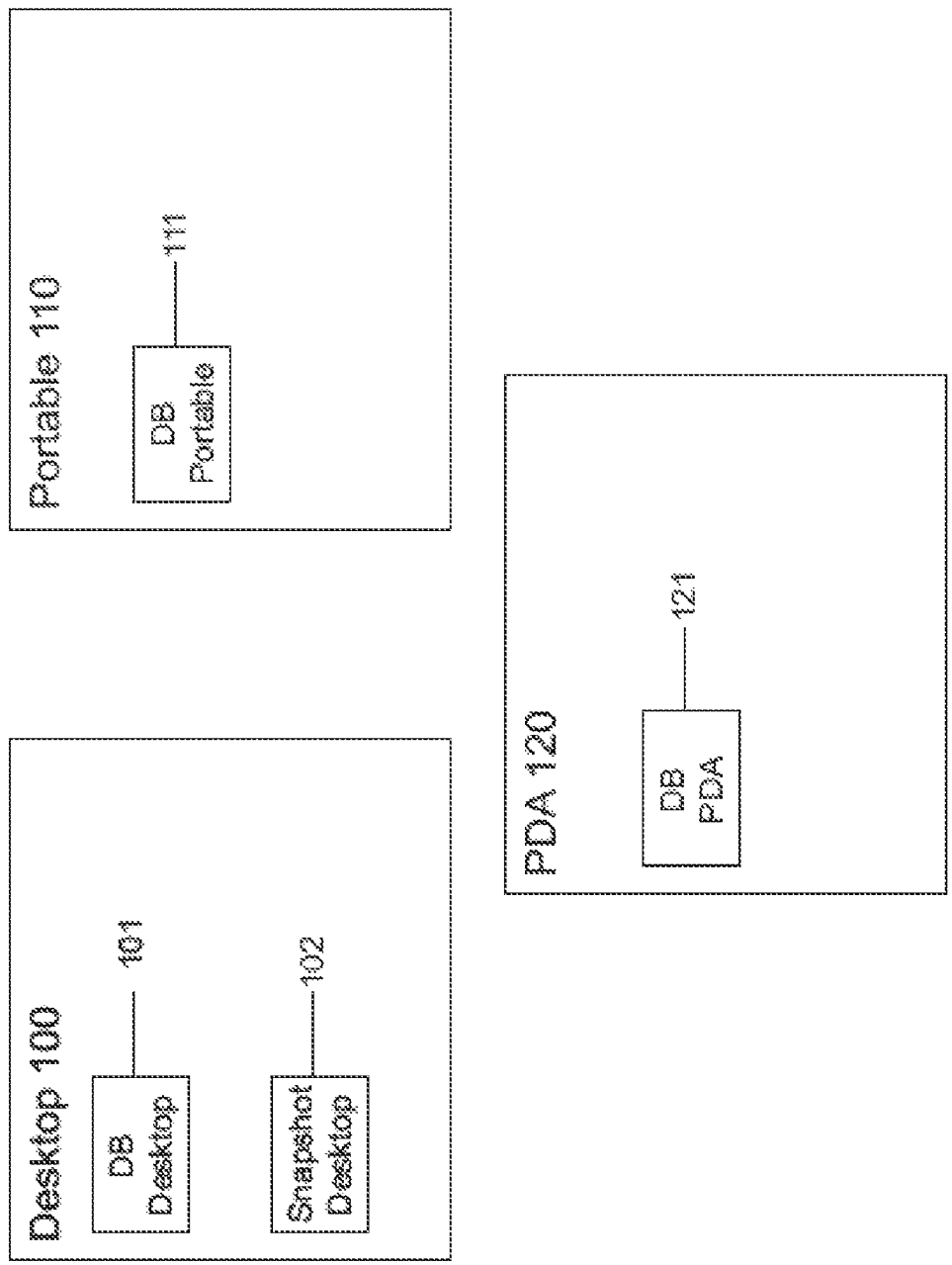
FIG. 1 shows devices that may synchronize.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

I. Vocabulary and Non-Limitation

Throughout this disclosure, we shall use certain vocabulary to discuss synchronization techniques and examples. Most of the illustrations discussed will relate to PIM data and the synchronization of same. However, many embodiments of the invention are expressly intended to apply to virtually any kind of data. Some examples of data that may be synchronized using the techniques taught herein are the following: calendar PIM data (calendars, events, tasks); contacts PIM data (contacts, contact groups); mail account information; notes; text files; word processing files; files from a file system; bookmarks; favorites lists; playlists; media files such as jpegs, mp3, mpeg2, mpeg4, or wav files; records from a database; or any other data file type, whether or not associated with a specific application.

Retreating then to the language of most of our illustrative embodiments, we shall primarily discuss the invention in terms of PIM data. Generally, we shall discuss devices such as computers, PDAs, phones or other intelligent devices that are used to access PIM data. Each device is generally associated with a synch client, which is usually one or more processes resident on the device. In some instances, a first device will have a sync client resident on another device (this is functionally proxy). This may be because the first device is not sufficiently equipped to host a sync client. Alternatively, in a multi-peer system, the synchronization system may use a local proxy for each other peer in order to synchronize all peers even when many peers are not present (i.e., the proxy stands in for the missing devices).

PIM data itself generally occurs as personal contacts, calendar entries, notes, journal entries, etc. PIM data may commonly be stored as one or more records. When we discuss a record, we are generally referring to a set of data items that has been interrelated. For example, a personal contact card for John Doe may be viewed as a record wherein a phone number, street address, pager number, and a variety of other data items are interrelated by their common association with John Doe. Each item of PIM data on a single device may have one or more corresponding data items on one or more other devices. For example, John Doe's street address may have corresponding data items on each of Jane Doe's desktop computer, portable computer, PDA, and telephone. Likewise, if our data were digital photographs, a picture of John Doe on the desktop may have corresponding pictures of John on the PDA, the portable computer, and elsewhere. It is a job of the synchronization function to provide a common view (as much as possible) of corresponding data across many devices.

II. Sample Hardware and Software Structures

Figure 2:
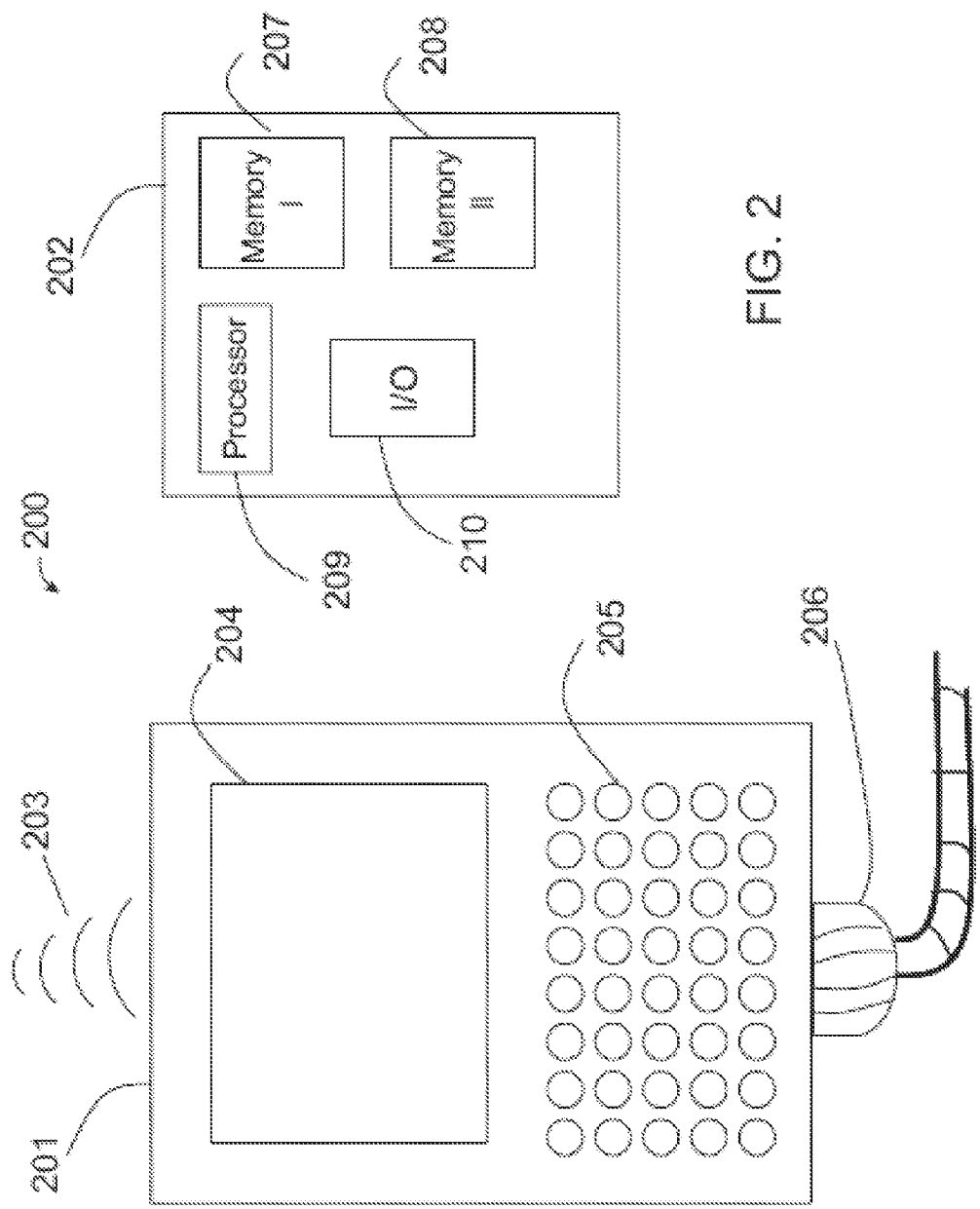
FIG. 2 shows exemplary hardware.

While the techniques described herein may be embodied in virtually any structural context, we shall describe some example structural embodiments for illustrative purposes. Referring to FIG. 2, there is shown a sample portable device such as a PDA or telephone handset. As stated earlier, a client device may be embodied in any item with sufficient intelligence to allow users to access or edit data. Therefore, the device of FIG. 2 is intended to illustrate, without limitation, a sample of any such device. Front view 201 of device 200 shows screen 204 that may be used for viewing or accessing data as well as inputting data (in the case of a touch-sensitive or otherwise input-equipped screen). Keypad 205 may also be used for data input such as by alpha-numerics or otherwise and wired connection 206 may be used for power and/or data transport. Wireless port 203 may be infrared, Bluetooth, 802.11 or any other wireless transmission for moving data in and out of device 200. Turning now to inside 202 of device 200, we see that a processor 209 is present for performing processing tasks. The inventive embodiments may incorporate any type of device so processor 209 may be one or more of any type of microprocessor or controller or aggregate of components that perform the function of running software for effecting one or more of the device functions. Device 200 may also have two or more types of memory for storing data and programs as shown by memories 207 and 208. These memories may be of any type such as magnetic memory, optical memory or any of the many types of silicon-based memory such as FLASH, SRAM and DRAM. Finally, device 200 may have components 210 to support I/O functionality such as that potentially embodied in wired connection 206 and wireless connection 203.

Figure 3:
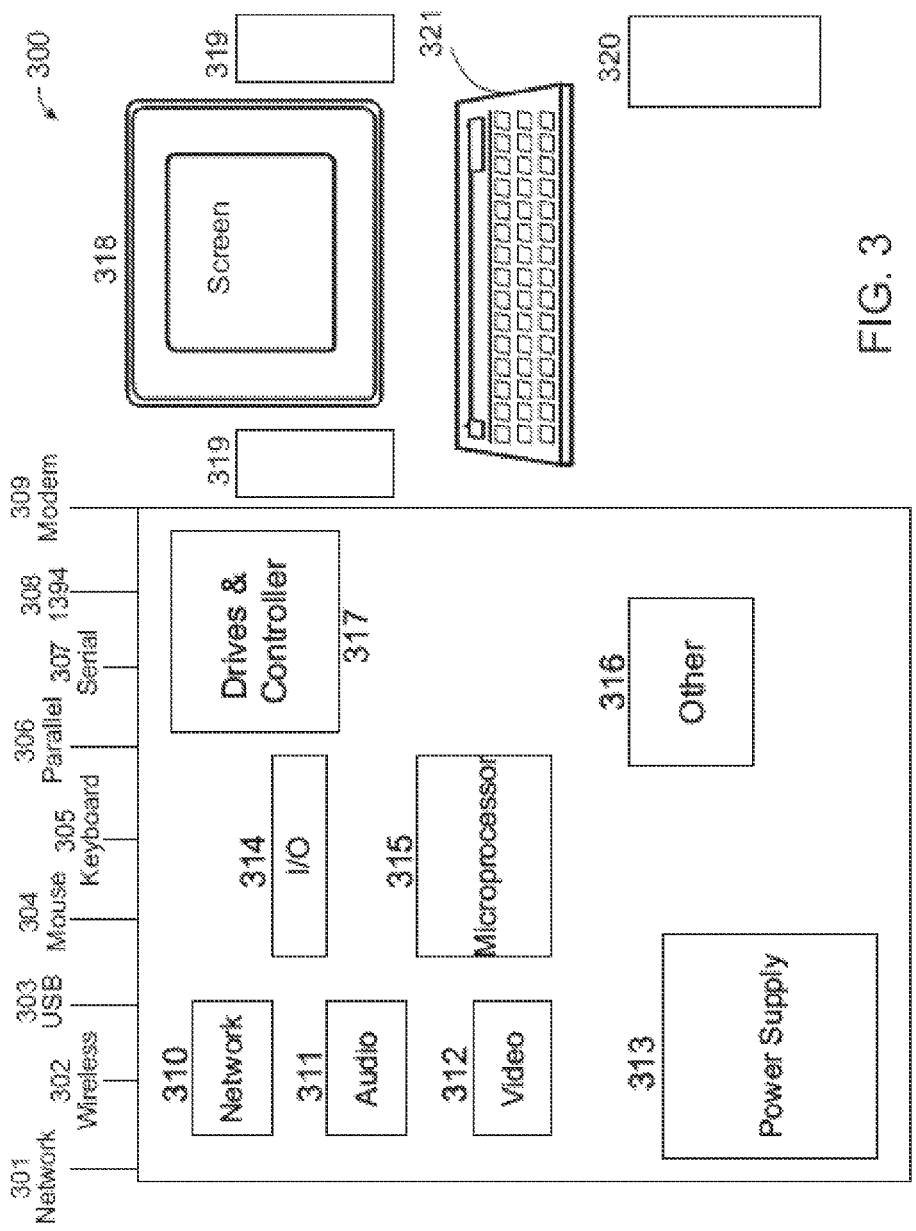
FIG. 3 shows exemplary hardware.

Referring now to FIG. 3, computer 300 is another illustration of a device that a user may use in conjunction with many of the disclosed techniques. Computer 300 is an ordinary computer, such as a personal computer, but not intended to be limited as such. Computer 300 has one or more microprocessors 315 and accompanying chipset (not shown) at the heart of the system. The chipset may include items such as network unit 310, audio unit 311 and many I/O functions such as those that might be embodied in I/O unit 314. Of course, any of these functions, or sub-functions, may be implemented individually or collectively within a chipset or outside. Computer 300 also has power supply 313 for adapting and supplying power. Computer 300 may have any variety of optical and magnetic drives and the appropriate controllers to use those drives such as IDE, ATA or SCSI controllers. For user accessibility, computer 300 has monitor 318, speakers 319, keyboard 321 and mouse 320 or an optional tablet/touch screen (not shown). Finally, computer 300 may connect with any manner of other items (such as other devices carrying corresponding data items) through various ports (Network 301, wireless 302, USB 303, parallel 306, serial 307, 1394 308 or modem 309).

Transitioning from sample hardware, we shall now discuss general software background. In particular, referring to FIG. 4, there is shown a software stack intended to be illustrative of the software architecture in which some embodiments of the invention will reside. Like our hardware examples, this structure is not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

Figure 4:
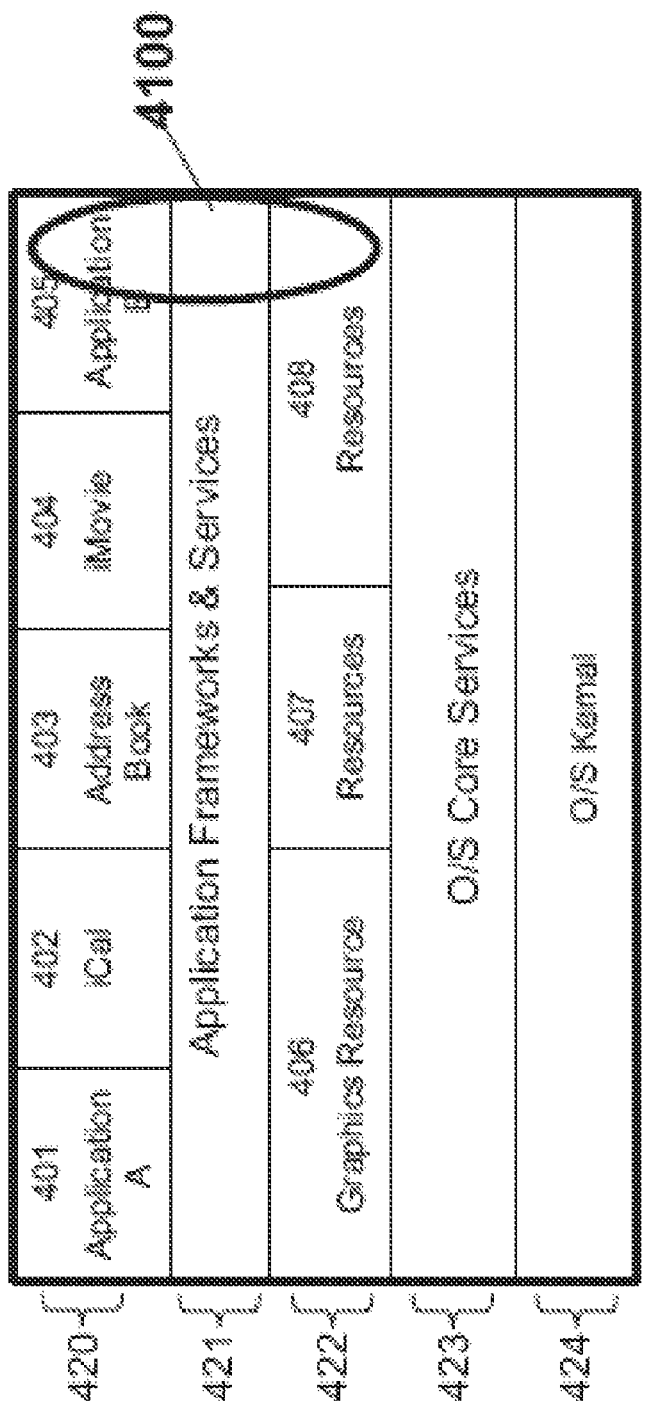
FIG. 4 shows an exemplary software stack.

With those caveats, we see in FIG. 4 two layers 424 and 423 dedicated to the operating system kernel and core services respectively. Generally above core services layer 423 there are software layers (422 and 421) for providing higher level resources and services to applications in the application layer 420. Putting the layer diagram in context, we would generally expect to find PIM type software in the application layer 420. For example, there is iCal application 402 and Address Book application 403 residing in the application layer. iCal 402 and Address Book 403 are application programs that manage PIM data and present a user interface that allows a user to access, edit or manipulate that data. These application layer services are a type of sync client in that a synchronization function provides services to these clients by maintaining a common view (as much as possible) of data among designated clients. In some embodiments, the application process itself can be a sync client. Area 4100 shows generally where processes implementing the synchronization function may be located in many embodiments. In more particularity, a process implementing the synchronization function may be a peer to its application clients or may reside in a layer below, possibly even masking itself to the application (referring to an application that does not know it is a sync client). The sync function may also have components in two or more layers. In many embodiments, however, the application level sync clients provide a user interface to configure and exploit the synchronization functions, therefore the synchronization processes may appear as an integrated feature in client software. In addition, the synchronization processes typically may present their own user interface for preferences, configuration and control that may be independent of any particular application. Lastly, as discussed earlier, sync clients may exist as a proxy for an external device. Such a proxy process has less need for a user interface and generally (but not necessarily) exists in the higher layers of the software stack Referring now to FIG. 5, there is shown a sample peer device having illustrative software modules therein. It may first be noticed that sample peer 520 bears the illustrative name "peer A, user 1," which indicates the illustrative metaphor for a physical sync client. In particular, some embodiments of the invention contemplate a separate sync client metaphor for each pairing of physical peer and user account. Thus, for such embodiments, a single physical peer or computer may have several sync clients by virtue of holding several users accounts, and presumably data sets for each user account. Of course, a sync client may also correspond with a physical peer alone, a user alone or any other metaphor known in the art now or hereafter.

Figure 5:
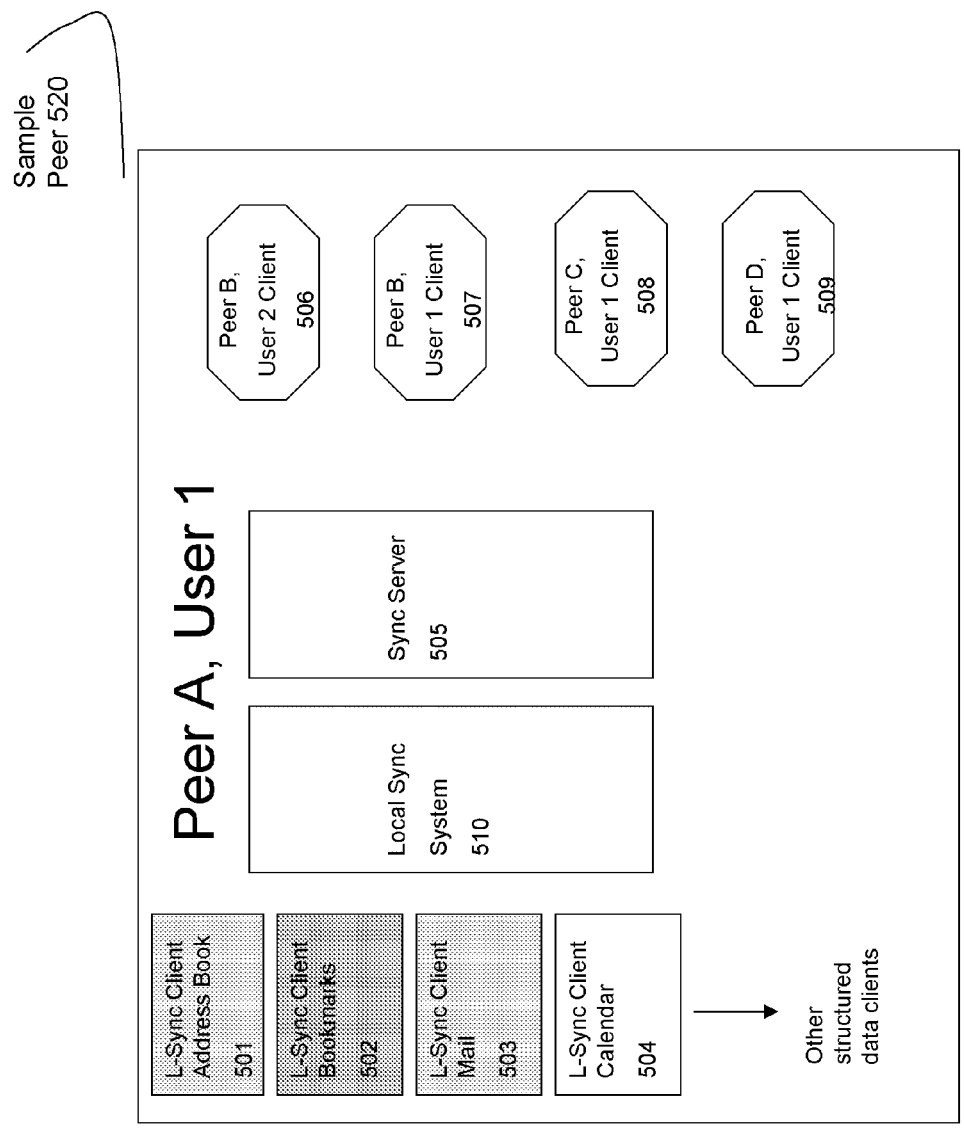
FIG. 5 shows a sync peer.

Still referring to FIG. 5, sample peer 520 has four local clients that use or require sync services. Those local sync clients are address book 501, bookmarks 502, mail 503 and calendar 504. Of course, sample peer 520 may have any number of local sync clients comprising virtually any type of software module but generally software modules that use structured data sets. Local sync system 510 represents the software modules in the sample peer 520 that are responsible for performing local synchronization, which is discussed briefly above and well known in the art. Generally, during the process of local synchronization, local sync system 510 assesses data changes in the local clients since the last synchronization and performs any necessary synchronization among local clients. In some embodiments, for purposes of local synchronization, local clients also comprise clients 506, 507, 508 and 509, described in more detail below.

Again referring to FIG. 5, some embodiments of the current invention comprise sync server 505, which functions for a number of reasons including to provide structure and services for synchronizing with other peers. The structure and related services are described below with reference to further description herein. In certain embodiments, the combination of local sync system 510 and sync server 505 may be deployed as single module or process. Thus, in discussing local synchronization herein, reference is generally being made to the operation of the local sync system 510; and when discussing intra-peer operations, reference is generally being made to the sync server 505. However, since local sync system 510 and sync server 505 may be implemented as a single module or process, the descriptions herein are not intended to exclusively confine the responsibilities of one or another of the modules. As a particular example, one embodiment may implement and divide functionality such that all of FIG. 5 excepting sync server 505 is found in the prior art. In such an embodiment, the addition of sync server 505 would be for the purpose upgrading the system and enabling the novel multi-peer system and functionality described herein. Therefore, in discussing the activity of peers herein, the discussions often relate to the software functionality of local sync system 510, sync server 505 or an amalgamation of those modules. One skilled in the art will understand the applicability of function to system elements.

Referring again to FIG. 5, in some embodiments, for each other peer in the family of synchronizing clients, peer 520 comprises a representative client module (a peer proxy module). In particular, sample peer 520 comprises peer B 506 (for user account 2 of peer B), peer B 507 (for user account 1 of peer B), peer C 508 and peer D 509. In some embodiments, peer 520 will only comprise client modules for peers that are known to sample peer 520. In a general sense and in some embodiments, modules 506 through 509 are resident on sample peer 520 as local representatives of their respective peers. Furthermore, some general uses of such proxy modules in the synchronization function are well known in the art and need not further be explained here; although, the particular function and structure of the modules described herein do form part of the inventions disclosed. For example, in some embodiments of the invention, the modules 506 through 509 are local representatives of their remote peers for a specific purpose of peer-to-peer synchronization. Thus, in such embodiments, each peer comprises a plurality of proxy modules with a collective purpose of providing peer-to-peer synchronization among and between each potential pair of the plurality of peers.

Figure 6:
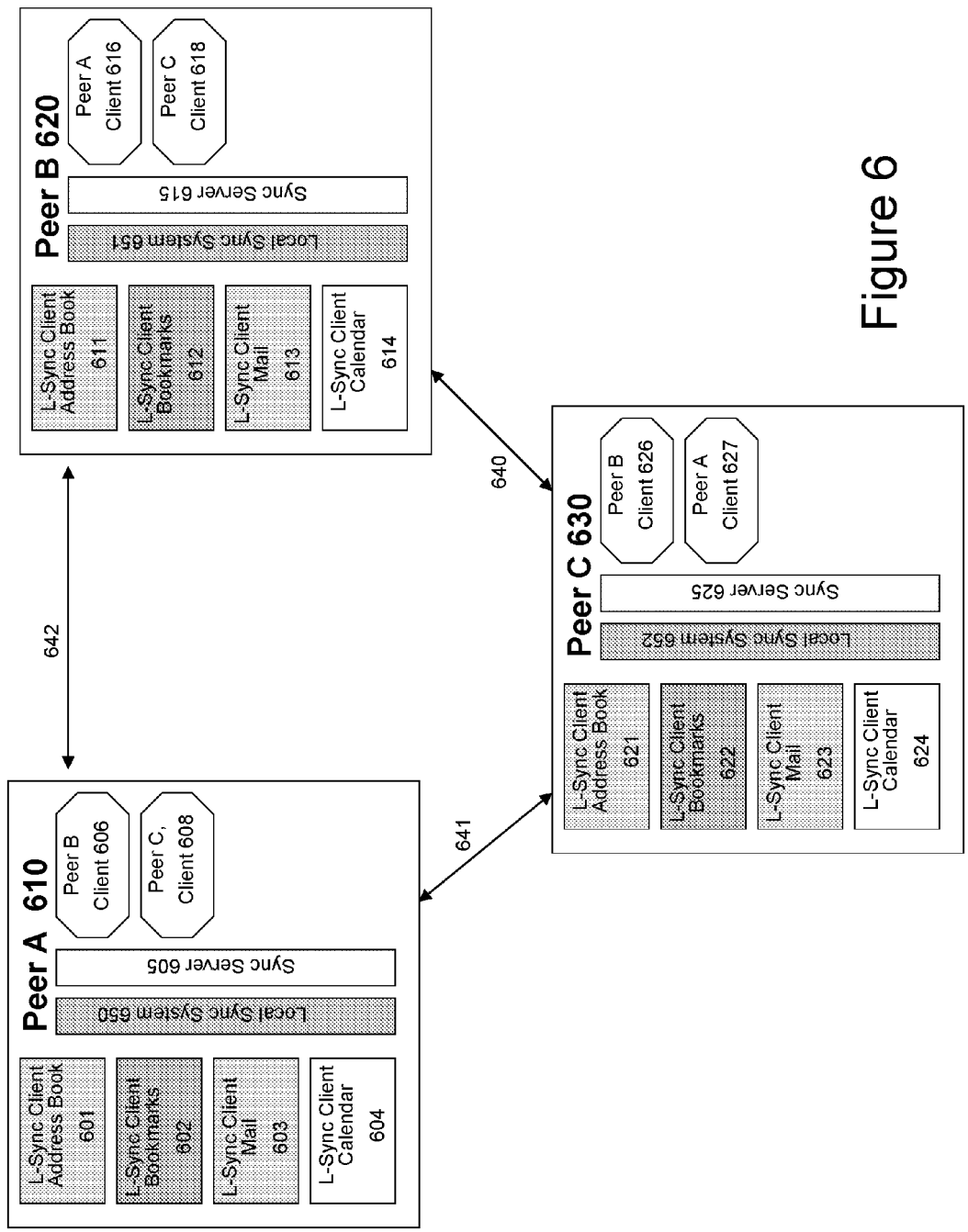
FIG. 6 shows a group of sync peers.

Referring now to FIG. 6, there is shown a plurality of sample peers. In particular, there is shown peer A 610, peer B 620 and peer C 630. As shown, like the sample peer in FIG. 5, each Peer in FIG. 6 comprises local clients, a local sync system, a sync server and software modules representative of other peers in the system (either known or unknown). Arrows 640, 641 and 642 are shown to indicate that some embodiments provide for direct communication from any peer to any other peer in the synchronizing system.

III. Discovery of Sync Peers

The inventions herein contemplate that peers (or nodes) in a peer-to-peer syncing system may have several alternative mechanisms and/or processes to discover other peers. As a primary mechanism, users may designate other peers for synchronization grouping. Such user designation may be performed through a user interface (e.g. by forms, menus or by prompting the user) and by indicating the identity of one or more of the following: peers, users, accounts, user groups or associations, account associations, user attributes or criteria, peer attributes or criteria, account attributes or criteria.

As a complement or supplement to peer discovery by user entry, peers may arrange to find each other through a network or conjoined networks. In this respect, there are many known techniques in the art providing for peers to discover each other and embodiments of the invention contemplate use of any of these techniques. For example, varying embodiments may employ Bonjour network discovery or Gnutella-type discovery.

Furthermore, software systems may arrange to search for and retrieve peer IDs or node IDs that meet any specified or suggested criteria. Thus, in some embodiments, peer discovery may be partially or totally automatic via one or more software modules that aid with the discovery process.

One technique for effecting software-aided discovery is to designate one or more software modules for keeping track of information about peers and/or groups of peers. For example, a sync server module or other software module may maintain a table, database or other data structure of information regarding peers or groups of peers. Thus, some peers (or software within those peers) may discover other peers by communicating with the module having the table or database. This module having the table or database may be analogized to an instant messaging server such as AIM or ICQ, which are well known in the art. Further, the well-known techniques applicable to instant messaging servers may be applied to embodiments of the invention.

The inventions herein contemplate a great variety of data that may be useful in the database or table discussed above. For example, and without any limitation intended, the database or table of certain embodiments may comprise any of the following information: the identity of peers and node or peer identity-related information; the availability of peers regarding their online status and accessibility information; the characteristics of the peers such as authority/credentials, group membership or associations, capabilities, configuration, preference regarding synchronization relationships, other preferences, and format and/or type of acceptable data.

Some embodiments of the invention comprise a way station software module that may aid the peer discovery function by maintaining a table or database similar to that discussed above. In addition to its other functions discussed below, the way station may aid discovery by providing information to peers in response to either queries from those peers or other stimulus in the system.

Thus, the way station or other software module comprising the data discussed above may perform a matchmaker function between peers. As suggested, matchmaking may be wholly automatic or contemplate any extent of user preferences or user direction. Furthermore, since implementation of this functionality is primarily through software, the way station or similar module may be present on any connected hardware platform, either in a peer, independent of a peer, locally connected or remotely connected.

Lastly, the inventions herein also contemplate that peer discovery may occur with respect to system and user events. For example, discovery techniques may be employed with respect to any of the following events: peer initialization; software initialization; predicate to a first sync; predicate to every sync; or predicate to select syncs (time interval or event dependent).

IV. Control Flow in Wide Area Syncing

Some embodiments of the invention call for a control flow between a plurality of peers for the purpose of synchronization. In particular, some embodiments employ a control flow that may be described through the metaphor of instigator peers and collaborator peers. Referring to FIG. 6, assume for illustrative purposes that peer A 610 is an instigator peer. An instigator peer is such due to its role in instigating syncing activity. Once an instigator fully initiates a sync session, all other peers are collaborators in that session. Thus, referring to FIG. 6, through use of sync server 605 or other appropriate software, peer A 610 may become an instigator peer by initiating syncing activity; leaving the role of collaborator peer to both peers B 620 and C 630. Since some embodiments allow any peer to be an instigator for some sync sessions and a collaborator for other sync sessions, the controlling software modules (e.g. sync server 605) may allow for a peer to embody either role.

Varying embodiments of the invention contemplate appointment of the instigator through various mechanisms. Some basic embodiments involve the following mechanisms for determining an instigator: the instigator may be pre-ordained by programming; the instigator may be determined by collective decision and action of the syncing group of peers once and forever; the instigator may be determined by collective decision and action of the syncing group of peers just some time before every sync event or at intervals between syncing events; the instigator may be appointed by the group every time there is a change to group membership; or the instigator may be determined by the designation of one or more users or administrators.

In other embodiments, the instigator may be self-appointed or somewhat self-appointed. In these embodiments, a peer may decide to instigate a sync event for any reason at any time, but without limitation, for any one or more of the following reasons: upon an event related to a sync client such as a PIM function; upon addition of peers or clients of any type; upon another system event such as start up or shut down; upon an indication of impending component or system failure; upon initiation of a backup power supply; upon user initiation; upon expiration of a timer; upon a set schedule.

In addition to determining the identity of instigators and collaborators, some embodiments comprise notions relating to the timing of sync sessions. In particular, in some embodiments, once an instigator makes a decision to sync, the sync may be initiated either immediately or upon a schedule or timed delay. Some embodiments impose a timed delay so as to employ minimal system resources during the delay. For example, at system start up, a prospective instigator may delay sync initiation for a designated amount of time or until system start up events have quieted. Alternatively, the delay may allow resources for the system to handle whatever event precipitated the desire to perform a synchronization. In some of these embodiments the delay will be for a fixed period of time, while in other embodiments the length of delay will change and/or be randomly decided for each event.

In certain embodiments as described, it may be possible for two peers to essentially simultaneously elect to be instigators. Thus, such two peers would essentially simultaneously initiate synchronization between all peers and their synchronization efforts would "collide." In some embodiments, the invention comprises rules and procedures to prevent the "collision" or any simultaneous operation of two instigators. In particular, if a first peer detects a collision (e.g. that another peer is/has initiated a sync), then the detecting peer should discontinue its efforts to initiate a sync. In some embodiments, after discontinuing such efforts, the detecting peer schedules or otherwise arranges to instigate a future sync. The timing of this future sync may be after a random or predetermined delay. A benefit of a random delay is to re-initiate a sync event with a low probability of "colliding" with another instigator again. In addition, if after scheduling a future sync instigation (due to a collision or otherwise), a peer is engaged as a collaborator, then some embodiments call for that peer to cancel its future sync (or amend the collaborator list) in order to prevent duplication with the current sync. Moreover, varying embodiments of the invention contemplate the use of any of the anti-collision type techniques well-known and used in the networking area.

For exemplary purposes, referring to FIGS. 6 and 7, FIG. 7 shows a multi-peer synchronization flow that may be enacted by the elements shown in FIG. 6. In step 1-750, instigator peer A begins its process of initiating a sync by determining the extent of all possible collaborators. There are a variety of techniques for making such determination and a related discussion has been provided above. With reference to FIG. 6, we see that instigator peer A 610 knows only about 2 other peers: peer B 606 and peer C 608. There are two corollary issues worth noting at this point. First, if peer A 610 discovers a collaborator for which peer A 610 does not have a proxy module (like 606 or 608), then a proxy module must ultimately be created; and may be created by sync server 605 or other known software techniques. Second, in some embodiments, peer A 610 may learn of new peers through its contact with known peers, for example, peer identity data structures may be an item that is synchronized.

Again, for exemplary purposes, referring to FIGS. 6 and 7, FIG. 7 shows that in step 2-752, instigator peer A initiates a sync cycle by requesting that all collaborator peers perform a local sync. In some embodiments, instigator peer A will also perform a local sync around the same time of making the request or after a response is received to the request (e.g. after change sets are received). In other embodiments, instigator peer A may have recently completed a local sync; and yet other embodiments, instigator peer A may incorporate a local sync at the same time the ultimately-received change sets are processed (e.g. one sync processes the change sets and the local sync).

As discussed earlier, in some embodiments a local sync comprises a local sync system 650, 651 or 652 assessing the data status of all local clients and performing local synchronization. In some embodiments, such synchronization performance involves producing data called a "change-set." The change-set comprises data updates destined for other sync peers (or, e.g., sync clients). In some embodiments, there are separate change-sets for each type of data (e.g., contacts, calendar, notes, to-do items, etc.)

Referring back to FIG. 7, in step 3-753, each collaborator (B702 and C 703) performs a local synchronization and produces one or more change-sets for the instigator. In some embodiments, there will be a single change-set for all purposes (incorporating all data changes of all data types). In other varying embodiments, separate change sets may be produced for each data type, for each peer or for each data type/peer combination. A typical change-set may comprise all the data changes that have transpired on a local sync client since the last time that a sync event occurred. Thus, during a local synchronization, data assessment may involve comparing the current state of data to a prior state of that data. There are certainly many other well-known ways to generate change-sets and the invention contemplates the use of any such mechanism, whether currently known or discovered hereafter.

Referring back to FIG. 7, in step 4-754, collaborators B 702 and C 703 store their change-sets. Some embodiments call for local storage of the change-sets, while other embodiments allow for remote storage or any storage in any place accessible by the respective peers. In addition, some embodiments require that change-sets be associated with a peer client. Thus, referring to FIG. 6 in the context of the example of FIG. 7: peer B may store four change-sets associated with peer A client 616 (one set for each of local sync clients 611 through 614); peer B may also store four change-sets associated with peer C client 618 (one set for each of local sync clients 611 through 614); peer C may store four change-sets associated with peer A client 627 (one set for each of local sync clients 621 through 624); and, peer C may also store four change-sets associated with peer B client 626 (one set for each of local sync clients 621 through 624).

Referring again to FIG. 7, in step 5-755 the collaborators send the change-sets to the instigator. Differing variations of the invention call for one or more of the following: sending single change-set incorporating changes for all data types; sending separate change-sets for each data type, whether or not there are actually changes in each set; sending only change-sets that have changes to report; sending messages other than change-sets for data types in which there are no changes to report.

Referring yet again to FIG. 7, in step 6-756 the instigator stores change-sets as they are received from the collaborator. As discussed earlier with respect to the collaborators, the instigator may have numerous options for storage locally or remotely.

Again, with reference to FIG. 7, in step 7-757 the instigator provides acknowledgement to the collaborators regarding receipt of the change-sets. The acknowledgement messages may be sent as change-sets are received or all-at-once after all change-sets are received. Next, in step 8-758, once the collaborators receive acknowledgement of the received change-set, each collaborator may delete the locally stored version to free memory or resources used for storing or tracking same.

Referring again to FIG. 7, in step 9-759, the instigator performs a local synchronization to incorporate all the collaborators' change-sets. This step implies a question of what the instigator may do if change-sets (or substitutes for same) are not received from every collaborator or from every expected data class from each collaborator. With regard to this question, varying embodiments of the invention call for the instigator to do one or more of the following: wait for all expected change-sets before performing local synchronization; waiting a predetermined amount of time and proceeding to local synchronization at the expiration of that time, whether or not all expected change-sets are received; prompting a user for direction; presenting the status of the synchronization to a user; or invoking a problem-resolution procedure or process.

Moreover, in some embodiments, as a result of the instigator-local synchronization, change-sets are produced for one or more of the collaborators (including, of course, embodiments where one or more change sets are produced for each collaborator). These change-sets may typically incorporate changes from any of the peers involved in the synchronization. Thus, for example, referring to FIG. 6 and our example where peer A 610 is the instigator, change-sets would be produced for peer B 620 and peer C 630; and further, peer B 620's change-set may incorporate data changes originally emanating from either peer A 610 local clients or peer C 630 local clients (such changes from peer C having been transferred to peer A as earlier described above). Of course, one skilled in the art will naturally extrapolate the concept to any number of peers.

Referring again to FIG. 7, in step 10-7510, the instigator propagates change-sets back to the collaborators. As described earlier with respect to collaborator change-sets, the instigator and collaborators may use a store and acknowledge protocol to make the change-set exchange atomic, and to free space in the system of the sending module.

Finally, referring again to FIG. 7, in step 11-7511, collaborators perform local syncs in order to incorporate changes received from the instigator. As indicated in FIG. 7, in a preferred embodiment, the collaborators do not produce change-sets for distribution back to the instigator. Using this embodiment allows the synchronization system to become quiescent for some period of time and prevents an endless succession of synchronizations resulting from data artifacts, miss-matches or rapidly changing data. Furthermore, this preferred embodiment allows for instigator handling of collaborator changes by either (i) not extracting changes during the instigator-local sync (e.g. leaving potential changes with the local client until another time), or (ii) extracting changes but holding them for propagation until a later time when those changes may or may not be aggregated with other data changes. In addition to this preferred embodiment, alternative embodiments call for other handling of the situation using one or more of the following techniques: allowing a fixed number of change-set ping-pong between the collaborators and instigator before a necessary/mandated quiescence; invoking a problem resolution process after a fixed number of change-set ping pong or a fixed amount of time; or allowing change-set ping pong to continue indefinitely.

A corollary issue to sync flow control is the matter of sync propagation through a set of syncing peers. In particular, assume a set of hypothetical syncing peers, A, B and C. If B initiates a sync but (for whatever reason) only syncs with A, then some embodiments call for A to notice that C is missing from the set. Thus, in such embodiments A will synchronize with C either after the A-B synchronization is complete or, if enabled to do so, by bringing C into the A-B process. Of course, if A waits for the termination of the A-B sync and then syncs with C, then C may notice that B is missing and propagate an endless chain of syncs around the ring. Thus, in some embodiments, in order to make sure that a chain of syncs doesn't lead to a endless/pointless cycle, when A syncs with C it will indicate it has just synced with B. Therefore, if C propagates the sync to another peer (say D), it will tell D this sync operation emanated from syncs with A and B. Thus, if D syncs with B, it won't redundantly cause a cycle since it will know B has already been involved in this particular chain of syncing. In some embodiments, syncs only propagate at all if there are data changes to propagate. Thus, in such embodiments, the problem of an endless sync cycle is self limiting by an absence of changes.

V. Missing Peer/Secondary Path/Way Station

Figure 8B:
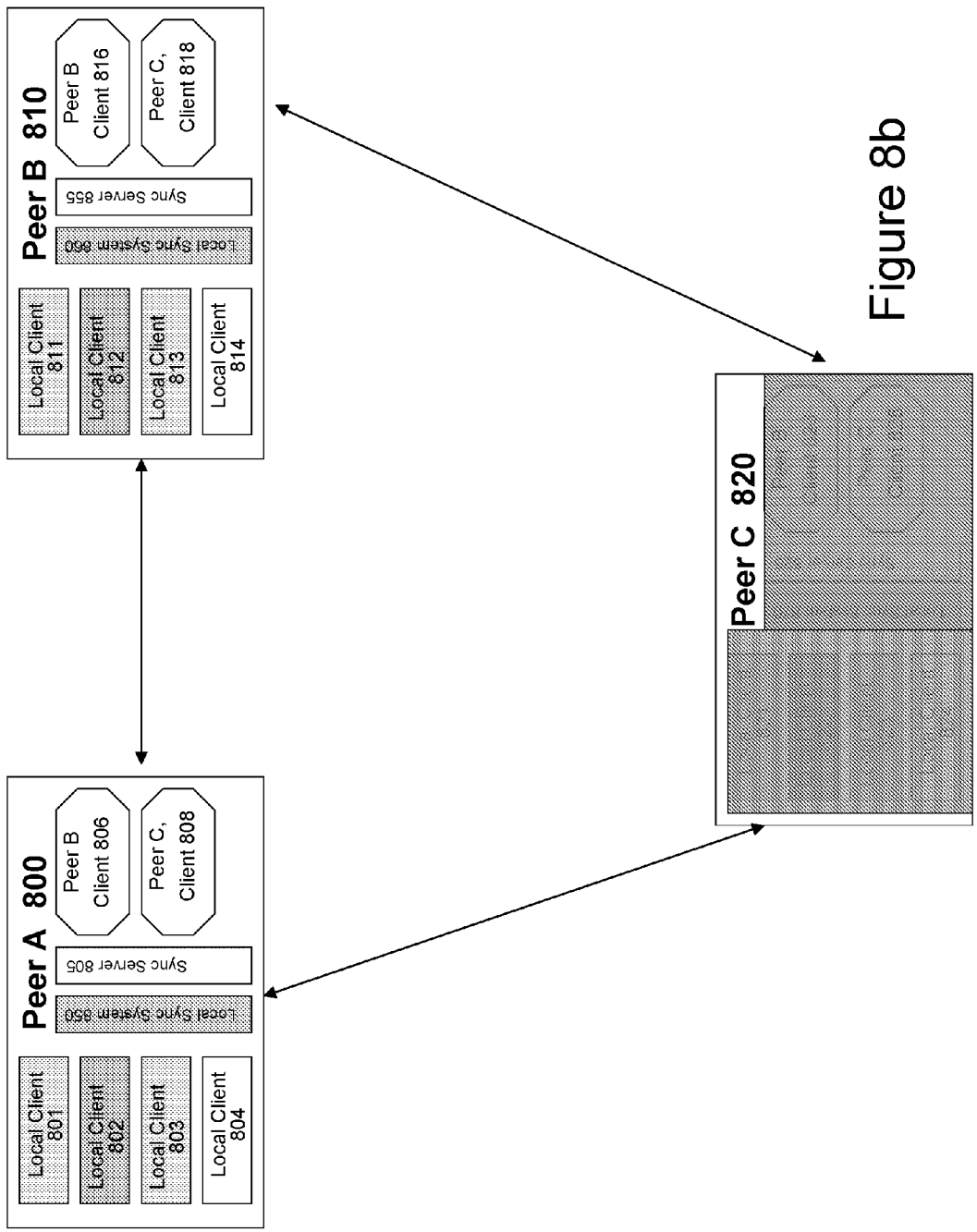
FIG. 8b shows a group of sync peers.

In the course of operation of any particular group of syncing peers, one or more of the group may be unavailable from time to time. For example, as shown in FIG. 8a, a communication gap or error 850 may make a peer unavailable. Alternatively, as shown in FIG. 8b, an entire peer (like peer C 820) or essential part of part of a peer may be powered off, broken or inoperable. Whatever the cause of peer unavailability, the invention comprises embodiments to perform synchronization in the absence of one or more peers. In particular, some embodiments allow for the instigator to prepare change-sets for missing collaborators but hold (by storing) those change-sets pending the availability of the particular collaborator. In some of those embodiments, multiple changes sets destined for the same peer are aggregated into a single change-set. In others of those embodiments, such multiple change-sets are simply accumulated and then applied sequentially to the missing peer after it becomes available. As discussed above, a storage and acknowledgement system may be applied that allows for safely deleting change-sets once they have been safely transmitted or used.

Figure 8C:
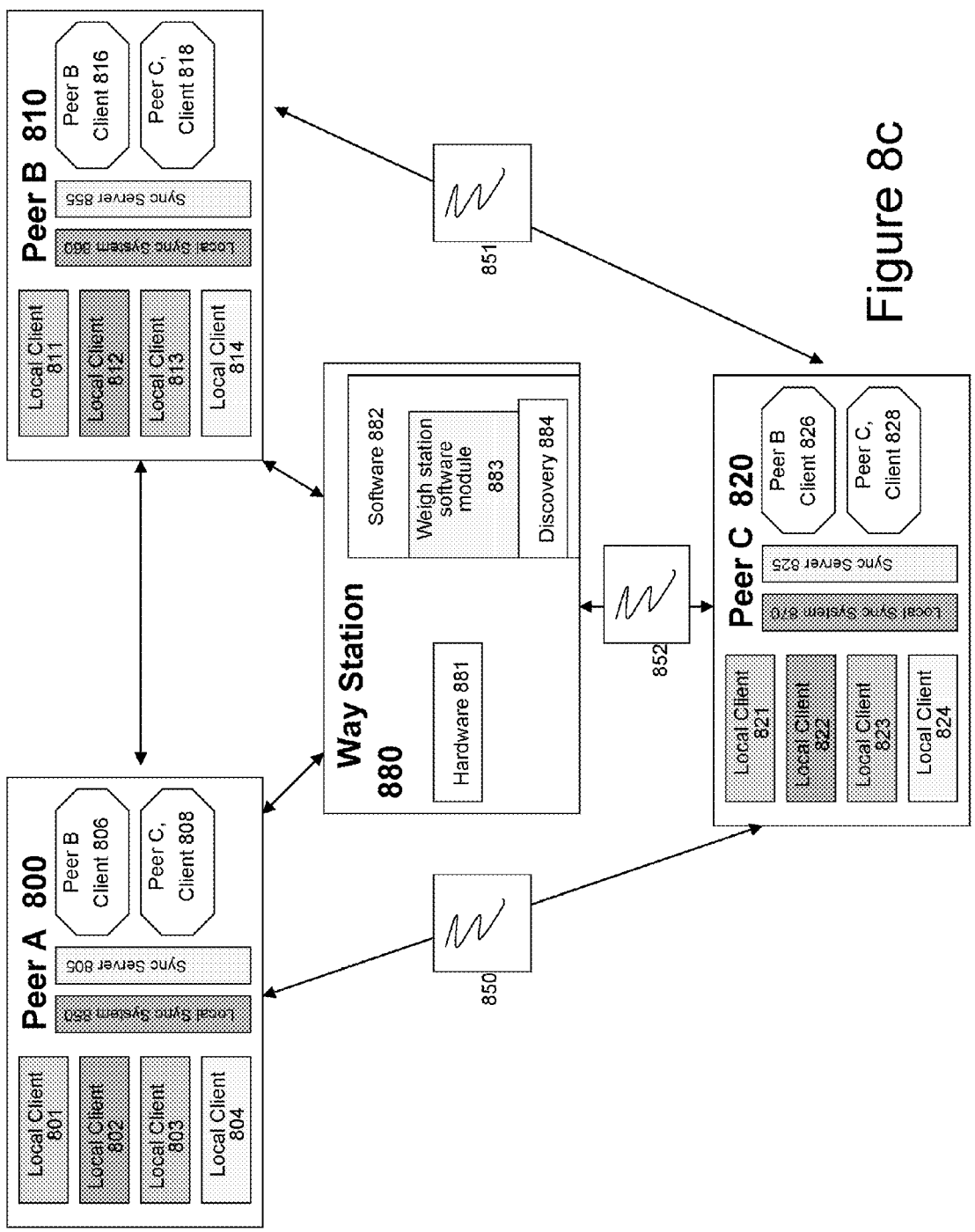
FIG. 8c shows a group of sync peers and a way station.

Some embodiments of the invention call for an intermediary process (e.g. software and data structures) accessible to a group of syncing peers. A metaphor for such a process is shown embodying software and hardware as way station 880 in FIG. 8c. Referring then to FIG. 8, way station 880 is shown having hardware 881 and software 882, with particular way station software 883. The embodiment of FIG. 8 is, however, not intended to be confining. The way station concept may be implemented on any node using any commercially available hardware such as that discussed earlier. Furthermore, the way station may co-exist on the same node as one or more sync servers. The way station may also occupy a separate node either on the same network as one or more of the other nodes, or on a different network, perhaps accessible through the Internet.

One interesting use for a way station process or node is to allow synchronization among nodes that are not simultaneously available on a network. While prior art services such as Apple Computer's ".MAC" provide a similar function, the way station conceptually differs in the manner described herein, for example by providing way station concept within a peer-to-peer syncing environment as compared to ".MAC's" hierarchical environment. Thus, FIG. 8c shows peer C 820 as disconnected from contact with way station 880 and the other peers 800 and 810. For clarity, the discontinuity is shown by the metaphor diagrams 850, 851 and 852; and all the network connectivity in FIG. 8 and similar figures is shown by the continuous two-headed arrows, which are intended to convey any known manner of network connections such as wired or wireless WANs, LANs, Internet or combinations thereof.

With reference to FIG. 8c, in the absence of connection to peer C 820, if peer B 810 or peer A 800 wishes to send data, such as one or more change-sets to peer C 820, the sending peers may use the way station as an intermediary node. There are several embodiments for such use that may be described from the perspective of the nodes involved. A peer having data to send to an absent peer, may transfer the data to a way station and either later check on delivery or treat the data as delivered to the absent peer. The way station may poll for data or wait for peers to push data. The way station may also monitor availability, capability and credentials of various nodes and use that data to provide services as any of the following; a pull-style directory service for availability, capability and or credentials; a match-making service to suggest or match syncing peers; a push-style notification service regarding any of availability, capability or credential. Lastly, a peer that knowingly exits the network for any reason (e.g. power down, failure or lost connection) may query the way station for data or wait for notification therefrom.

Since the invention contemplates any combination of the foregoing, the following few examples are provided as illustrative. Peers may push data to the way station and rely upon the way station to monitor the availability of the missing node; when the node becomes available, the way station may push the data to the node. Alternatively, peers may push data to the way station, and as a matter of course when nodes become available or otherwise periodically, nodes can check the way station for any data waiting. In yet another alternative, a peer may discover other peers through the way station but those other peers may be unavailable for syncing; thus the available peer may begin the synchronization by leaving change-set data on the way station. When the missing peers become available, they can sync directly with the instigating peer or, if the instigating peer is unavailable, they may leave their change-sets on the way station for later transfer to the instigation. In addition, like the peers, the way station can use a store and acknowledge system so that data may be deleted after a transaction is complete. Thus, using such a system for deleting data, some embodiments of the invention do not require the way station to maintain any substantive data such as PIM data. Instead, in those embodiments the way station merely holds data ephemerally, for example, in some embodiments only until receipt acknowledgement is received after a transfer.

With reference to the way station embodiments described, one skilled in the art will realize that the method and system described with respect to FIG. 7 can be applied as well by using a way station as a remote proxy for any missing peers. Of course, while less evident, this includes embodiments where synchronizing peers additionally comprise way station software and functionality.

As shown in FIG. 8c, software module 884, way station 880 may also serve the purpose of an aid to peer discovery. Thus, discovery module 884 may perform the types of discovery aid discussed and/or that discovery analogous to an ICQ or AIM server.

VI. Peer Syncing Through Multiple Paths

As one may infer from the discussion above, or from the diagram of FIG. 8c, the use of a way station may provide multiple paths between two peers. Given the vagaries of communication link reliability and node availability, there is potential in such a system for confusion in certain situations. For example, if data is left on way station 880 by peer A 800 for peer C 820, and when peer C comes back online, peer A is also available but the way station is not. In this situation and others, confusion can arise between peers A and C because A may believe data has been sent to peer C, while (in the absence of the way station) peer C has actually received no data. Thus, in order to resolve this potential confusion some embodiments of the invention contemplate record keeping and in some cases data keeping by the nodes.

By way of example, any combination of one or more of the following techniques may be used as a solution to the potential confusion. One solution is for the sending node to retain a record of its way station use so that when it interacts with other syncing peers it can check the record and confirm that data sent through the way station was actually received. Of course, in other embodiments, the sending peer will retain copies of the any data transmitted through the way station until receipt confirmation can be obtained from the actual recipient, perhaps with such confirmation to be provided using the way station as a vehicle for delivery. Conversely, some embodiments require each peer to provide confirmation for any data to the actual sending peer (but perhaps using the way station as a vehicle to send that confirmation).

VII. NAT Traversal

The description herein makes repetitive mention of networks and connectivity for communication between peers, nodes and/or way stations (generally called "nodes" for purposes of this discussion). In practice, these nodes may be deployed either individually or on separate LANs or networks presenting security and credentials problems for traffic between nodes. The inventions herein fully appreciate and contemplate the use of techniques for traversing heterogeneous network; such techniques being well known in the literature of the current day. Furthermore, with respect to NAT traversal and related areas, this application specifically incorporates by reference the currently pending patent application entitled "NAT Traversal For Media Conferencing," by Joe Abuan, Joshua Graessley, Hyeonkuk Jeong and Berkat Tung, assigned to Apple Computer and having the Ser. No. 10/769,841. One skilled in the art will understand the application of the techniques described therein to the current invention. Thus, the inventions herein fully contemplate the use of NAT traversal techniques and the like for facilitating commutation between nodes in the disclosed systems.

VIII. Multi-Touch User Interface

Where the embodiments of this invention call for user interface and user input, the invention contemplates the use of any known manner of such input. However, one manner of input interesting for controlling synchronization or designating synchronization preferences and function is a manner involving touch sensitive systems (such as a touch pad or touch sensitive surface(s) used in combination with software to interpret gestures and touches to the sensing surface(s)). Thus, any embodiment of the invention calling for user interaction contemplates the potential use of touch sensing of one or multiple finger signals or gestures. Further, such gestures (whether effected with one or multiple fingers) may be augmented in meaning through the use of fusion concepts where sound, light, user proximity or other input mechanisms are interpreted together with such gestures. For purpose of further disclosure of gestures and touch sensing that may be used in connection with disclosed embodiments, reference is made to U.S. patent application Ser. No. 11/232,299, filed Sep. 21, 2005 and entitled "System and Method For Processing Raw Data Of Track Pack Device," and is incorporated herein by reference.

One skilled in the art will understand that the concepts disclosed herein may be employed in embodiments and technical areas that vary from the disclosed embodiments. Those embodiments are intended only as illustrative and without limitation.

We claim:

1. A method of synchronizing a first peer with a second peer and a third peer, the method comprising the steps of:
    appointing said first peer as an instigator of a synchronization session;

said first peer making an indication to said second and third peers;

in response to said indications, said second and third peers performing first local synchronizations and generating respectively a second peer change set and a third peer change set;

transmitting said second peer change set from said second peer to said first peer;

transmitting said third peer change set from said third peer to said first peer;

said first peer receiving said second and third peer change sets from the second and third peers;

performing a second local synchronization at the first peer using the second and third peer change sets;

in response to said second local synchronization, said first peer producing a first return change set for said second peer and a second return change set for said third peer; and said second peer and said third peer each performing a third local synchronization respectively using said first return change set and said second return change set.

2. The method of claim 1, wherein said first peer discovers a new peer through synchronization with said second peer.

3. The method of claim 1, wherein said first peer discovers a new peer through interaction with a way station software module.

4. The method of claim 1, wherein said first peer presents a user interface to a user regarding the discovery of a new peer.

5. The method of claim 4, wherein said user interface regarding the discovery of the new peer system accepts input from a touch sensing system.

6. The method of 5, wherein said accepted input comprises at least one gesture involving multiple simultaneous points of contact with the touch sensing system.

7. The method of claim 5, wherein said user interface regarding the discovery of the new peer system accepts fusion input, said fusion input comprising input from a touch sensing system combined with at least one other type of input.

8. The method of claim 1, wherein said first peer uses Bonjour techniques to discover a new peer.

9. The method of claim 1, wherein said first peer uses Gnutella-type techniques to discover a new peer.

10. The method of claim 3, wherein said first peer communicates with the way station software module to obtain information regarding the new peer.

11. The method of claim 10, wherein said way station software module runs on a hardware platform different from said first peer.

12. The method of claim 10, wherein said way station software module is associated with a directory data structure, said directory data structure comprising information regarding said sync system peers.

13. The method of claim 12, wherein said directory data structure comprises information regarding users of peer systems.

14. The method of claim 12, wherein said directory data structure comprises information regarding software or hardware platforms of said peer systems.

15. The method of claim 1, wherein said second peer and said third peer do not propagate additional change sets in response to performing the second local synchronization respectively using said first return change set and said second return change set.

16. The method of claim 1, wherein the step of transmitting said second peer change is preceded by the additional step of storing said second peer change set.

17. The method of claim 1, wherein the step of appointing said first peer as an instigator comprises the substeps of:

said first peer and said second peer both essentially simultaneously attempting to instigate a synchronization session;

said first peer learning about the activity of said second peer;

said first peer ceasing its instigating activity; and said first peer, after ceasing its instigating activity, waiting a time period and after said time period, instigating a subsequent synchronization session.

18. The method of claim 17, wherein said time period is derived from a randomly determined data.

19. The method of claim 1, wherein said step of receiving said second and third change sets comprises the step of using NAT traversal techniques.

20. The method of claim 1, wherein said step of receiving said second and third peer change sets comprises the additional step of sending receipt acknowledgement indications respectively to said second peer and said third peer.

21. The method of claim 1, wherein:

the step of transmitting said second peer change is preceded by the additional step of storing said second peer change set;

said step of receiving said second peer change set comprises the additional step of sending receipt acknowledgement indications to said second peer; and said second peer receiving said acknowledgement indication and in response thereto deleting said second peer change set.

22. A method of synchronizing a first peer with a second peer and a third peer, wherein said second peer and said first peer communicate only by leaving messages with a way station peer, the method comprising the steps of:

appointing said first peer as an instigator for a synchronization session;

said first peer making an indication to said third peer;

said first peer leaving an indication message for said second peer on said way station peer;

in response said indication, said third peer performing a first local synchronization and generating a third peer change set;

transmitting said third peer change set from said third peer to said first peer;

said first peer receiving said third peer change set and using said third peer change set to perform a second local synchronization;

after said second local synchronization, said second peer receiving said indication message via said way station peer;

in response to said indication message, said second peer performing a third local synchronization and generating a second peer change set; and said first peer performing a fourth local synchronization using said second peer change set.

23. The method of claim 22, comprising the additional step of said second peer leaving a second change set message on said way station peer.

24. The method of claim 23, comprising the additional step of said first peer receiving said second change set message and then communicating directly with said second peer to acquire said second peer change set.

25. The method of claim 22, wherein said second change set message comprises said second peer change set.

26. A method of synchronizing a first peer with a second peer and a third peer, wherein said second peer and said first peer communicate by leaving messages with a way station peer, the method comprising the steps of:
- appointing said first peer as an instigator for a synchronization session;
- said first peer making an indication to said third peer;
- said first peer leaving an indication message for said second peer on said way station peer;
- in response said indication, said third peer performing a first local synchronization and generating a third peer change set;
- transmitting said third peer change set from said third peer to said first peer;
- said first peer receiving said third peer change set and using said third peer change set to perform a second local synchronization;
- after said second local synchronization, said second peer receiving said indication message via said way station peer;
- in response to said indication message, said second peer performing a third local synchronization and generating a second peer change set;
- said second peer leaving a second change set message on said way station peer;
- appointing said first peer as an instigator a second time;
- said first peer sending an indication to said second peer; and
- determining that a prior synchronization attempt was made by using said way station module;
- appointing said first peer as an instigator of another synchronization session a second time;
- said first peer sending an indication to said second peer; and
- determining that a prior synchronization attempt was made by using said way station peer.

27. The method of claim 26, comprising the additional step synchronizing using data from said second peer change set but without the involvement of said way station peer.

28. A media device readable by a computing apparatus and encoded with instructions stored thereon to cause the computing apparatus to perform a method of synchronizing a first peer with a second peer and a third peer, the method comprising the steps of:
- appointing said first peer as an instigator of a synchronization session;
- said first peer making an indication to said second and third peers;
- in response to said indications, said second and third peers performing first local synchronizations and generating respectively a second peer change set and a third peer change set;
- transmitting said second peer change set from said second peer to said first peer;
- transmitting said third peer change set from said third peer to said first peer;
- said first peer receiving said second and third peer change sets from the second and third peers;
- performing a second local synchronization at the first peer using the second and third peer change sets;
- in response to said second local synchronization, said first peer producing a first return change set for said second peer and a second return change set for said third peer; and
- said second peer and said third peer each performing a third local synchronization respectively using said first return change set and said second return change set.

29. The device of claim 28, wherein said first peer discovers a new peer through synchronization with said second peer.

30. The device of claim 28, wherein said first peer discovers a new peer through interaction with a way station software module.

31. The device of claim 30, wherein said first peer communicates with the way station software module to obtain information regarding the new peer.

32. The device of claim 31, wherein said way station software module runs on a hardware platform different from said first peer.

33. The device of claim 31, wherein said way station software module is associated with a directory data structure, said directory data structure comprising information regarding said sync system peers.

34. The device of claim 33, wherein said directory data structure comprises information regarding users of peer systems.

35. The device of claim 33, wherein said directory data structure comprises information regarding software or hardware platforms of said peer systems.

36. The device of claim 28, wherein said first peer presents a user interface to a user regarding the discovery of a new peer.

37. The device of claim 36, wherein said user interface regarding the discovery of the new peer system accepts input from a touch sensing system.

38. The device of claim of 37, wherein said accepted input comprises at least one gesture involving multiple simultaneous points of contact with the touch sensing system.

39. The device of claim of claim 37, wherein said user interface regarding the discovery of the new peer system accepts fusion input, said fusion input comprising input from a touch sensing system combined with at least one other type of input.

40. The device of claim 28, wherein said first peer uses Bonjour techniques to discover a new peer.

41. The device of claim 28, wherein said first peer uses Gnutella-type techniques to discover a new peer.

42. The device of claim 28, wherein said second peer and said third peer do not propagate additional change sets in response to performing the second local synchronization respectively using said first return change set and said second return change set.

43. The device of claim 28, wherein the step of transmitting said second peer change is preceded by the additional step of storing said second peer change set.

44. The device of claim 28, wherein the step of appointing said first peer as an instigator comprises the substeps of:
- said first peer and said second peer both essentially simultaneously attempting to instigate a synchronization session;
- said first peer learning about the activity of said second peer;
- said first peer ceasing its instigating activity; and
- said first peer, after ceasing its instigating activity, waiting a time period and after said time period, instigating a subsequent synchronization session.

45. The device of claim 44, wherein said time period is derived from a randomly determined data.

46. The device of claim 28, wherein said step of receiving said second and third change sets comprises the step of using NAT traversal techniques.

47. The device of claim 28, wherein said step of receiving said second and third peer change sets comprises the additional step of sending receipt acknowledgement indications respectively to said second peer and said third peer.

48. The device of claim 28, wherein:
the step of transmitting said second peer change is preceded by the additional step of storing said second peer change set;
said step of receiving said second peer change set comprises the additional step of sending receipt acknowledgement indications to said second peer; and
said second peer receiving said acknowledgement indication and in response thereto deleting said second peer change set.

49. A media device readable by a computing apparatus and encoded with instructions stored thereon to cause the computing apparatus to perform a method of synchronizing a first peer with a second peer and a third peer, wherein said second peer and said first peer communicate only by leaving messages with a way station peer, the method comprising the steps of:
appointing said first peer as an instigator for a synchronization session;
said first peer making an indication to said third peer;
said first peer leaving an indication message for said second peer on said way station peer;
in response said indication, said third peer performing a first local synchronization and generating a third peer change set;
transmitting said third peer change set from said third peer to said first peer;
said first peer receiving said third peer change set and using said third peer change set to perform a second local synchronization;
after said second local synchronization, said second peer receiving said indication message via said way station peer;
in response to said indication message, said second peer performing a third local synchronization and generating a second peer change set; and
said first peer performing a fourth local synchronization using said second peer change set.

50. The device of claim 49, comprising the additional step of said second peer leaving a second change set message on said way station peer.

51. The device of claim 50, comprising the additional step of said first peer receiving said second change set message and then communicating directly with said second peer to acquire said second peer change set.

52. The device of claim 49, wherein said second change set message comprises said second peer change set.

53. A media device readable by a computing apparatus and encoded with instructions stored thereon to cause the computing apparatus to perform a method of synchronizing a first peer with a second peer and a third peer, wherein said second peer and said first peer communicate by leaving messages with a way station peer, the method comprising the steps of:
appointing said first peer as an instigator for a synchronization session;
said first peer making an indication to said third peer;
said first peer leaving an indication message for said second peer on said way station peer;
in response said indication, said third peer performing a first local synchronization and generating a third peer change set;
transmitting said third peer change set from said third peer to said first peer;
said first peer receiving said third peer change set and using said third peer change set to perform a second local synchronization;
after said second local synchronization, said second peer receiving said indication message via said way station peer;
in response to said indication message, said second peer performing a third local synchronization and generating a second peer change set;
said second peer leaving a second change set message on said way station peer;
appointing said first peer as an instigator a second time;
said first peer sending an indication to said second peer; and
determining that a prior synchronization attempt was made by using said way station module;
appointing said first peer as an instigator of another synchronization session a second time;
said first peer sending an indication to said second peer; and
determining that a prior synchronization attempt was made by using said way station peer.

54. The device of claim 53, comprising the additional step synchronizing using data from said second peer change set but without the involvement of said way station peer.

* * * * *

UNITED STATES PATENT AND TRADEMARK OFFICE
CERTIFICATE OF CORRECTION

PATENT NO.       : 7,760,767 B2                                          Page 1 of 1
APPLICATION NO.  : 11/620618
DATED            : July 20, 2010
INVENTOR(S)      : Bruce Nilo, Gordie Freedman and Toby Paterson It is certified that error appears in the above-identified patent and that said Letters Patent is hereby corrected as shown below:

1. In Claim 23 at lines 26-30, delete the following text:
   "appointing said first peer as an instigator a second time;
   said first peer sending an indication to said second peer;
     and
   determining that a prior synchronization attempt was made
     by using said way station module;"

2. In Claim 53 at lines 28-32, delete the following text:
   "appointing said first peer as an instigator a second time;
   said first peer sending an indication to said second peer;
     and
   determining that a prior synchronization attempt was made
     by using said way station module;"

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,760,767 B2 Page 1 of 1
APPLICATION NO. : 11/620618
DATED : July 20, 2010
INVENTOR(S) : Bruce Nilo, Gordie Freedman and Toby Paterson It is certified that error appears in the above-identified patent and that said Letters Patent is hereby corrected as shown below:

Column 17, lines 24-28 (Claim 26 at lines 26-30), delete the following text:
        "appointing said first peer as an instigator a second time;
        said first peer sending an indication to said second peer;
          and
        determining that a prior synchronization attempt was made
          by using said way station module;"

Column 20, lines 30-34 (Claim 53 at lines 28-32), delete the following text:
        "appointing said first peer as an instigator a second time;
        said first peer sending an indication to said second peer;
          and
        determining that a prior synchronization attempt was made
          by using said way station module;"

This certificate supersedes the Certificate of Correction issued October 26, 2010.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,760,767 B2 | Page 1 of 1 |
| APPLICATION NO. | : 11/620618 | |
| DATED | : July 20, 2010 | |
| INVENTOR(S) | : Bruce Nilo et al. | |

It is certified that error appears in the above-identified patent and that said Letters Patent is hereby corrected as shown below:

In column 5, line 54, after "stack" insert -- . --.

In column 16, line 41, in claim 22, after "response" insert -- to --.

In column 17, line 8, in claim 26, after "response" insert -- to --.

In column 18, line 30, in claim 39, after "of claim" delete "of claim".

In column 19, line 23, in claim 49, after "response" insert -- to --.

In column 20, line 14, in claim 53, after "response" insert -- to --.

Signed and Sealed this
Eighth Day of November, 2011

David J. Kappos
*Director of the United States Patent and Trademark Office*